(12) United States Patent
Kasperkovitz

(10) Patent No.: US 7,072,614 B1
(45) Date of Patent: Jul. 4, 2006

(54) COMMUNICATION DEVICE

(76) Inventor: Wolfdietrich Georg Kasperkovitz, Eikenlean 4, NL-5581 HA, Waake (NL)

( * ) Notice: Subject to any disclaimer, the term of this patent is extended or adjusted under 35 U.S.C. 154(b) by 1038 days.

(21) Appl. No.: 10/018,454

(22) PCT Filed: May 29, 2000

(86) PCT No.: PCT/EP00/04993

§ 371 (c)(1),
(2), (4) Date: Dec. 7, 2001

(87) PCT Pub. No.: WO00/76078

PCT Pub. Date: Dec. 14, 2000

(30) Foreign Application Priority Data

Jun. 8, 1999 (EP) .................................. 99201803

(51) Int. Cl.
*H04B 7/14* (2006.01)
*H04B 1/06* (2006.01)
*H04B 1/10* (2006.01)
*H04B 1/44* (2006.01)

(52) U.S. Cl. ...................... 455/24; 455/78; 455/278.1; 455/296

(58) Field of Classification Search ................ 455/24, 455/296, 278.1, 78
See application file for complete search history.

(56) References Cited

U.S. PATENT DOCUMENTS

| | | | | |
|---|---|---|---|---|
| 4,660,042 A | * | 4/1987 | Ekstrom | 342/175 |
| 4,954,732 A | * | 9/1990 | Surauer et al. | 327/552 |
| 5,444,864 A | | 8/1995 | Smith | |
| 6,067,448 A | * | 5/2000 | Ho et al. | 455/78 |
| 6,249,687 B1 | * | 6/2001 | Thomsen et al. | 455/553.1 |

FOREIGN PATENT DOCUMENTS

EP 0390354 10/1990

* cited by examiner

*Primary Examiner*—Barry Taylor
(74) *Attorney, Agent, or Firm*—R. M. McDermott, Esq.

(57) ABSTRACT

Communication device comprising a transmitter and a receiver, coupled to antenna means respectively via a transmitter output and a receiver input. For an effective and reliable reduction of transmitter leakage signals occurring at the receiver input corrective signal means are being used, comprising transmitter leakage signal selective amplifying means for selectively amplifying said transmitter leakage signal provided with a transmitter signal reference input being coupled to the transmitter output, a transmitter leakage signal input being coupled to the receiver input and a transmitter leakage signal output being coupled to said transmitter leakage signal input for a negative feed back of said transmitter leakage signals.

40 Claims, 6 Drawing Sheets

COMMUNICATION DEVICE

Figure 1:
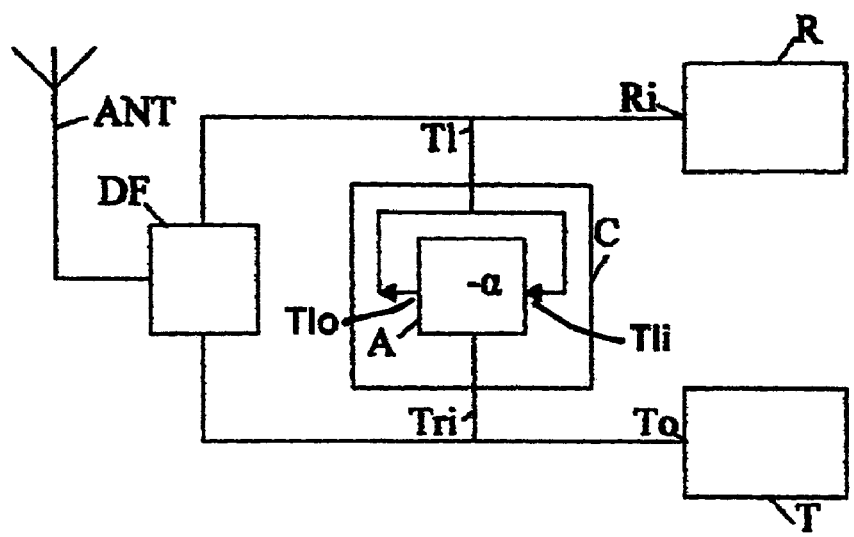

The invention relates to a communication device comprising a transmitter and a receiver, coupled to antenna means respectively via a transmitter output and a receiver input, as well as corrective signal means arranged for reducing a transmitter leakage signal at the receiver input and provided with a transmitter signal reference input being coupled to the transmitter output.

Communication devices of such type, also being referred to as transceivers, are known e.g. from U.S. Pat. No. 5,444,864. In particular transceivers with single antenna means for transmission and reception require specific filtering between antenna, transmitter output and receiver input to protect the receiver during the transmission phase. The isolation between the transmitter output and the receiver input should be high enough to guarantee that the blocking voltage at the receiver input is not reached even under worst case situations where the output power of the transmitter is set to its maximum level and the reflection coefficient of the antenna reaches its maximum value due to body effects. In the known communication device use is made a.o. of a so called diplexer interconnecting the antenna means the receiver input and the transmitter output for the purpose of directing signals received by the antenna means to the receiver input and signals to be transmitted from the transmitter output to the antenna means. To cancel the portion of the transmitter signal arriving at the receiver input, e.g. via leakage through the diplexer or electromagnetic radiation coupling, hereinafter also referred to as transmitter leakage signal use is made of a so called signal canceler, functioning as said corrective signal means. The signal canceller is to generate a cancellation signal, which is a substantially gain and phase matched estimate of the transmitter leakage signal measured at the receiver put and which is fed forward to the receiver input signal path via a summer, in which it is subtracted from the leakage transmitter signal.

However, the concept of signal cancellation applied in the known communication device is highly demanding with regard to the accuracy and performance of the circuitry needed. For example, the conformity in phase and amplitude between the cancellation signal on the one hand and the leakage transmitter signal on the other hand is critical for a proper cancellation. Small mutual deviations strongly degrade the cancellation and may even result in an increase of transmitter leakage signal. Apart therefrom, this known concept require the provision of circuitry, which inevitably cause unwanted side effects to occur, such as the summer, which inherent to its function strongly reduces the overall signal to noise ratio of the communication device.

It is a first object of the invention to overcome the above drawbacks of the conventional communication device and to increase the performance thereof.

A second object of the invention is to improve the sensitivity of the receiver in full duplex mode.

According to the invention a communication device comprising a transmitter and a receiver, coupled to antenna means respectively via a transmitter output and a receiver input, as well as corrective signal means arranged for reducing a transmitter leakage signal at the receiver input and provided with a transmitter signal reference input being coupled to the transmitter output, is therefore characterized in that the corrective signal means comprises transmitter leakage signal selective amplifying means arranged for selectively amplifying said transmitter leakage signal, a transmitter leakage signal input being coupled to the receiver input and a transmitter leakage signal output being coupled to said transmitter leakage signal input thereby forming a negative feed back of the transmitter leakage signal occurring at the receiver input.

The invention is based on the recognition that the phase and gain requirements to obtain an effective reduction of the transmitter leakage signal in a feed back loop are much easier to comply with than those to be complied with by the cancellation signal in a feed forward reduction of the transmitter leakage signal. Where the cancellation signal in the known communication device has narrowly match the transmitter leakage signal in gain and phase, the gain of the leakage transmitter signal in the feedback loop according to the invention only has to be sufficiently large, whereas its phase only has to be reversed, i.e. shifted over a fixed 180°, to obtain an effective reduction thereof. Furthermore, the feedback concept allows to dispense with circuitry introducing unwanted side effects such as a summer.

A preferred embodiment of such communication device is characterized in that the transmitter leakage signal selective amplifying means comprise a phase splitter, an input thereof being coupled to the transmitter output, supplying respectively in-phase (I) and quadrature phase (Q) components of a transmitter signal to reference signal inputs of first and second demodulators, as well as to carrier signal inputs of first and second modulators, said first and second demodulators having a transmitter leakage signal input in common with a transmitter leakage signal terminal of the corrective signal means being coupled to the receiver input, and outputs being coupled respectively through first and second low pass filters to modulating signal inputs of said first and second modulators, an output of said modulators being coupled in common to the transmitter leakage signal inputs of said first and second demodulators and phase inverting means being included in the signal path of the transmitter leakage signal selective amplifying means.

By applying this measure, the pair of I and Q transmitter output signalcomponents, are respectively used in the first and second demodulators as a demodulators as a demodulation signal for a synchronous quadrature demodulation of the transmitter leakage signal occurring at the receiver input, resulting in I and Q baseband transmitter leakage signalcomponents. After a baseband selection in said first and second low pass filters, these I and Q baseband transmitter leakage signalcomponents are re-modulated using the I and Q transmitter output signalcomponents as modulation carrier signals. The so obtained re-modulated I and Q transmitter leakage signalcomponents are negatively fed back to the receiver input. The phase inversion needed therefore is provided by said phase inverting means and can be applied anywhere in the loop, i.e. in the baseband or in the RF part of the loop.

For a combination of the re-modulated I and Q transmitter leakage signalcomponents into a single transmitter leakage signal at the receiver input without introducing signal distorsion or noise, preferably the first and second modulators each comprise transconductance amplifying means an output thereof being coupled in common to the receiver input and the transmitter leakage signal inputs of said first and second demodulators.

Another preferred embodiment of a communication device according to the invention is characterized in that the transmitter leakage signal selective amplifying means provides a non-linear, input signal amplitude dependent amplification of the selected transmitter leakage signal. This measure allows to adapt the degree of reduction of the transmitter leakage signal to its degrading effect on the receiver input signal, therewith saving power while maintaining optimum performance.

Preferably, the non-linear amplification is being provided by dead zone control means coupled between the first and second low pass filters on the one hand and the first and second modulators on the other hand providing in-phase and quadrature phase components of a baseband modulation signal having a dead zone for amplitude variations of the respective output signals of the first and second lowpass filters within a range between predetermined first and second threshold levels, the in-phase and quadrature phase components of said baseband modulation signal are varying in amplitude with the respective output signals of the first and second lowpass filters for amplitude variations beyond said range.

Dead zone signal amplification is on itself known e.g. from U.S. Pat. No. 4,277,695. The use thereof in accordance with the above measure allows to adjust the operative range of the corrective means and to trade off noise against receiver performance degradation.

Preferably, said dead zone is being determined by the maximum allowable receiver input voltage. As a result thereof the operation of the corrective means is switched off for those transmitter leakage signals, which are acceptable and do not lead to performance degradation, hereinafter also referred to as desensitization. In said switched off state, the corrective means is prevented from reducing the signal to noise ratio of the receiver input signal.

Another preferred embodiment of a communication device according to the invention is characterized by a duplex filter having first and second stages, the transmitter output being coupled through said first stage to the antenna means, the antenna means being coupled through said second stage to the receiver input and to the transmitter signal reference terminal of the corrective signal means.

This measure further improves the performance of the communication device mainly in that a reduction in sideband noise is obtained therewith.

Another improvement in noise performance is achieved by an attenuator coupled between the antenna means and the transmitter leakage signal input of the corrective signal means.

Yet another preferred embodiment of a communication device according to the invention is characterized in that said dead zone control means comprises first and second in-phase signal splitters and first and second quadrature phase signal splitters for splitting said dead zone in-phase and quadrature phase components of the baseband modulation into positive and negative in-phase and positive and negative quadrature phase components, said positive, respectively negative, components being supplied to cool inputs of first variable transconductor amplifiers of the first and second modulators, respectively through and second phase inverters to second variable transconductor amplifiers of the first and second modulators, outputs of said first variable transconductor amplifiers and outputs of said second variable transconductor amplifiers through third and second phase inverters being coupled to the transmitter leakage signal terminal of the corrective signal means.

This measure allows to combine the re-modulated positive and negative in-phase and positive and negative quadrature phase RF transmitter leakage signalcomponents into a single feed back transmitter leakage signal without using a resistive voltage summing circuit, therewith preventing this combination from degrading the signal to noise ratio at the receiver input.

Preferably, variable transconductor amplifiers are used only for the amplitude varying ones of the positive and negative in-phase and positive and negative quadrature components of the dead zone baseband modulation signal. This results in a reduction of circuitry needed for an effective implementation of the communication device.

Figure 2:
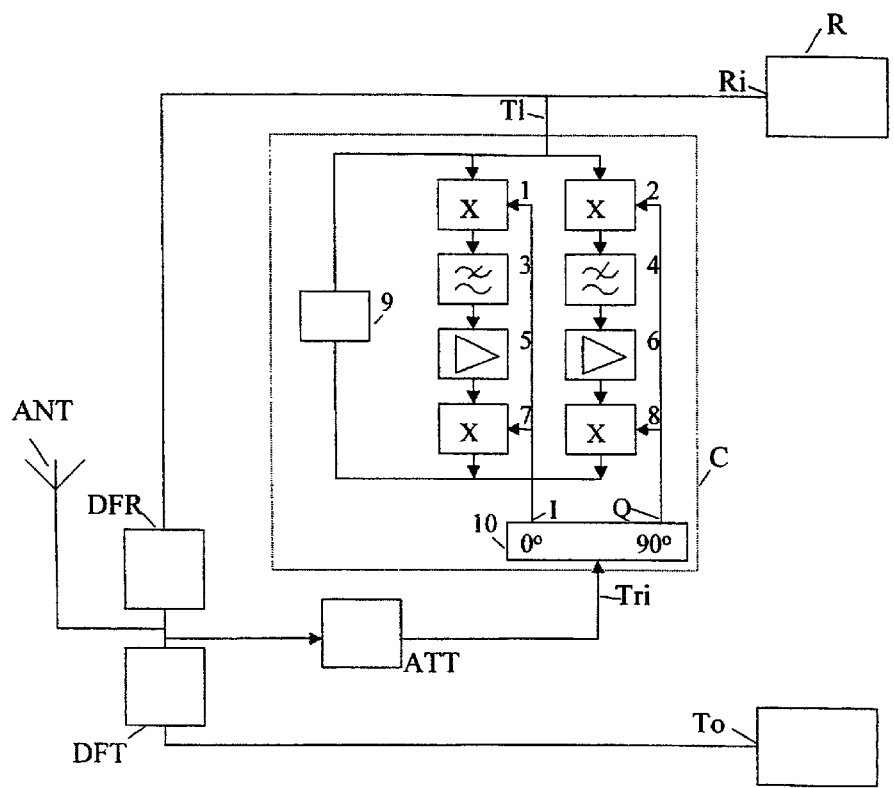
Figure 3:
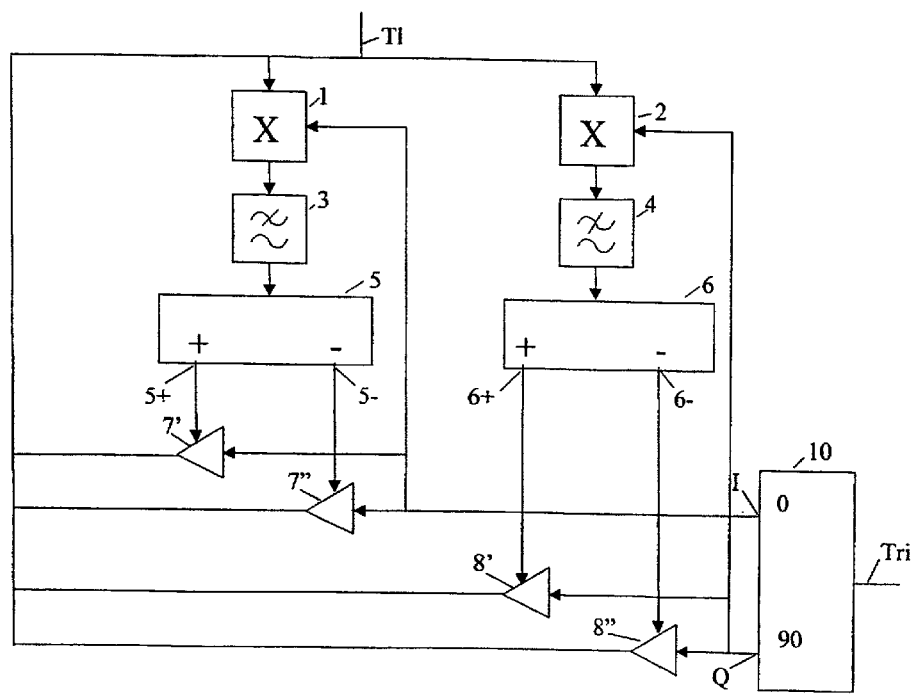
Figure 4:
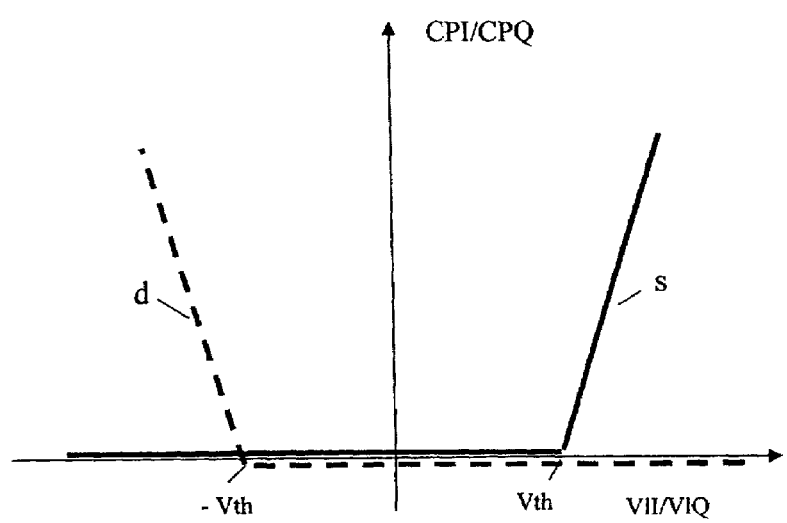
Figure 5:
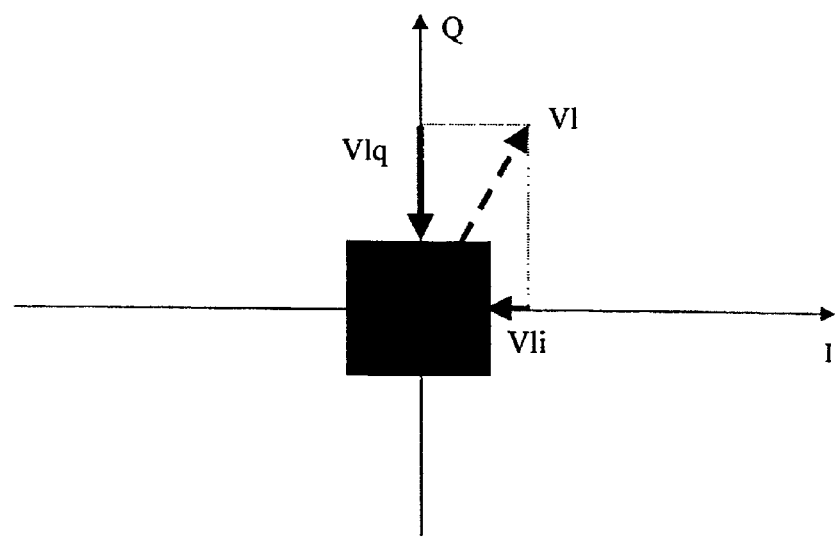
Figure 6:
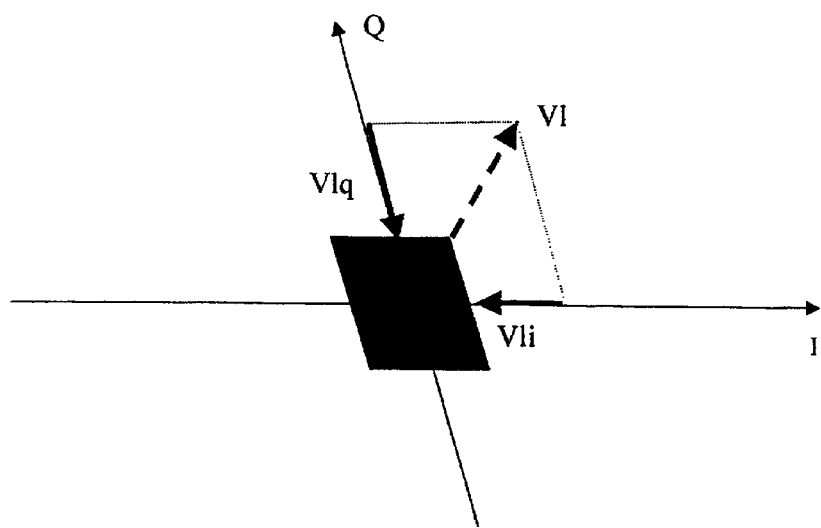

The above and other object features and advantages of the present invention will be discussed in more detail hereinafter with reference to the disclosure of preferred embodiments and in particular with reference to the appended Figures, that show:

FIG. 1 a schematic diagram of a communication device according to the invention;

FIG. 2 a blockdiagram of a preferred embodiment of a communication device according to the invention;

FIG. 3 a blockdiagram of alternative corrective means for use in the communication device of FIG. 1 or 2;

FIG. 4 a characteristic diagram of the output control signal of the dead zone means for use in the communication device of FIG. 1, 2 or 3;

FIG. 5 a vector diagram illustrating the reduction of transmitter leakage in a communication device according to the invention;

FIG. 6 a vector diagram illustrating the reduction of transmitter leakage in a communication device according to the invention when using a non-ideal quadrature phasesplitter.

FIG. 1 shows a communication device according to the invention comprising a transmitter T and a receiver R, coupled respectively via a transmitter output To and a receiver input Ri to an input and an output of a duplex filter DF, an input/output terminal thereof being coupled via a bidirectional link to antenna means ANT. The communication device also comprise corrective signal means C for reducing a transmitter leakage signal Vl leaking through to and occurring at the receiver input Ri. The corrective signal means C is provided with a transmitter leakage signal terminal Tl being coupled to the receiver input Ri and with a transmitter signal reference input Tri being coupled to the transmitter output To. The corrective signal means C comprise transmitter leakage signal selective amplifying means A having a transmitter leakage signal input Tli coupled to the transmitter leakage signal terminal Tl for supplying thereto the transmitter leakage signal Vl occurring at the receiver input Ri. A transmitter leakage signal output Tlo of the selective amplifying means A is commonly coupled with the transmitter leakage signal input and the transmitter leakage signal terminal Tl, therewith closing a feedback loop. The selective amplifying means A provides for a selection, amplification (e.g. with factor α) and phase inversion or 180° phase shift of the transmitter leakage signal Vl, resulting in an output signal, in the given example −αVl, which is fed back to its transmitter leakage signal input effecting the transmitter leakage signal in the loop, i.e. the transmitter leakage signal occurring at the receiver input Ri, to reduce to $Vl/(1+\alpha)$.

For the selection of the transmitter leakage signal Vl, the selective amplifying means A may comprise any type of active frequency controlled filter arrangement using the transmitter output signal at the transmitter signal reference input Tri to lock the resonance frequency thereof to the carrier frequency of the transmitter leakage signal to be selected. The selective amplifying means A may alternatively be based on phase splitting of the transmitter leakage signal Vl into its in-phase (I) and phase quadrature (Q) signalcomponents, followed by mutually separated selection and amplification thereof and subsequent re-combination into a single transmitter leakage signal. This will be further clarified with reference to FIGS. 2 and 3.

FIG. 2 shows a blockdiagram of a preferred embodiment of a communication device according to the invention, in which elements corresponding to those shown in FIG. 1 have same references.

The transmitter leakage signal selective amplifying means A comprise a phase splitter 10, an input thereof being coupled to the transmitter signal reference input Tri, for splitting the transmitter output signal into a pair of in-phase (I) and phase quadrature (Q) signalcomponents and for supplying those respectively to reference signal inputs of first and second demodulators 1 and 2, as well as to carrier signal inputs of first and second modulators 7 and 8. Said first and second demodulators 1 and 2 both have an input in common with the transmitter leakage signal input of the transmitter leakage signal selective amplifying means A and the transmitter leakage signal terminal Tl of the corrective signal means C and provide for a synchronous quadrature demodulation of the transmitter leakage signal into a pair of baseband I and Q transmitter leakage signalcomponents. Outputs of the first and second demodulators 1 and 2 are respectively coupled through first and second low pass filters 3 and 4 for a selection of said baseband I and Q transmitter leakage signalcomponents to first and second dead zone control means 5 and 6 providing for a non-linear amplification of said baseband I and Q transmitter leakage signalcomponents. The so amplified baseband I and Q transmitter leakage signalcomponents are thereafter respectively supplied to first and second modulators 7 and 8 providing a re-modulated pair of I and Q transmitter leakage signalcomponents, which are combined at the transmitter leakage signal output of the selective amplifying means A into one single re-modulated transmitter leakage signal. The circuitry 1, 3, 5, 7 and the circuitry 2, 4, 6, 8 therewith respectively form I and Q signal paths of the transmitter leakage signal selective amplifying means A, in which the I and Q transmitter leakage signalcomponents are being processed mutually separated. The re-modulated transmitter leakage signal is negatively fed back to the input of the transmitter leakage signal selective amplifying means A through a phase inverter 9.

The dead zone control means 5 and 6 provide zero output for any signal supplied to their input having a magnitude smaller than a certain predetermined threshold level, and provide high gain amplification ($\alpha$) to input signals having a magnitude greater than said threshold level. This means, that for magnitudes of the transmitter leakage signals smaller than said threshold level the corrective means are not operative, this effect also being referred to as desensitization of the corrective means. By choosing said threshold level to correspond to the maim receiver input voltage, a desensitization in correcting insignificant transmitter leakage signals is obtained, which does not degrade the overall receiver performance, while maintaining an effective reduction of significant transmitter leakage signals. Said desensitization furthermore prevents noise from being introduced in the receiver input signal. This all considerably increase the power efficiency as well as the sensitivity of the receiver when operating in full duplex mode.

The duplex filter DF may be constituted by a Fujitsu D5CG type duplex filter having a transmitter related portion DFT, also referred to as first stage, coupled to a receiver related portion DFR, also referred to as second stage, the common connection between those stages being coupled in common to the antenna means ANT and to an input of an attenuator ATT. An output of the attenuator ATT is coupled to the transmitter sign reference input Tri of the corrective signal means C. The transmitter output signal is supplied through the transmitter related portion DFT prior to the use thereof signal in the transmitter leakage signal selective amplifying means A as demodulation, respectively modulation signal. This results in a reduction of sideband noise at the receiver input. The attenuator ATT further improves the overall performance of the communication device.

FIG. 3 shows a blockdiagram of alternative corrective means for use in the communication device of FIG. 1 or 2, in which elements corresponding to those shown in FIG. 1 have same references. The first and second modulators 7 and 8 are formed by respectively a pair of positive and negative controllable operational transconductor amplifiers 7' and 7" and a pair of positive and negative controllable operational transconductor amplifiers 8' and 8", signal inputs thereof being respectively coupled to the I and Q outputs of the phase splitter 10 and signal outputs thereof being fed back in common to the input of the transmitter leakage signal selective amplifying means A, i.e. the common input of the demodulators 1 and 2. The baseband I and Q transmitter leakage signalcomponents selected by the low passfilters 3 and 4 and amplified in the dead zone control means 5 and 6 are now being used to vary the gain of the respective operational transconductor amplifiers 7', 7", and 8', 8". Said operational transconductor amplifiers have no provision to deal with change in signal polarity of the gain control signal. To overcome this restriction, the dead zone control means 5 and 6 provide for a splitting of the signals to be processed on the basis of their polarity. This will be clarified with reference to FIG. 4. The deadzone control means 5 and 6 are provided with positive and negative output terminals 5+ and 5−, respectively 6+ and 6−, the transfer characteristic of the deadzone control means 5 and 6 from their inputs to their respective positive output terminals 5+ and 6+ being represented by a solid line s and the transfer characteristic of the deadzone control means 5 and 6 from their inputs to their respective negative output terminals 5− and 6− being represented by a dotted line d. For input signal magnitudes smaller than a predetermined threshold value Vth, the signals CPI, respectively CPQ, at the output terminals 5+, 5−, 6+ and 6− have zero value. Positive baseband I and Q transmitter leakage signalcomponents selected by the low passfilters 3 and 4 having an amplitude increasing beyond +Vth will generate an outputsignal CPI/CPQ of the deadzone control means 5 and 6 at their respective positive output terminals 5+ and 6+ following the solid line curve s of FIG. 4. Negative baseband I and Q transmitter leakage signalcomponents selected by the low passfilters 3 and 4 having an amplitude decreasing below −Vth will generate an outputsignal CPI/CPQ of the deadzone control means 5 and 6 at their respective negative output terminals 5− and 6− following the dotted line curve d of FIG. 4. The threshold value Vth is preferably chosen to correspond to the maximum receiver input level.

The magnitudes of the output signals of the operational transconductor amplifiers are mutually similarly varying with the gain control signals, whereas their phase is either in-phase or in anti phase with their input signals. By choosing the operational transconductor amplifiers 7' and 8' to vary in anti-phase with their input I transmitter leakage signalcomponent and the operational transconductor amplifiers 7" and 8" to vary in-phase with their input Q transmitter leakage signalcomponent a phase inversion is realised without the need for separate phase inverting means, such as the phase inverter 9 in FIG. 2.

FIG. 5 shows a vector diagram illustrating the reduction of transmitter leakage in a communication device according to the invention as shown in FIGS. 2 and 3, in which Vl represents the transmitter leakage signal occurring at the receiver input Ri without the corrective signal means C. The I and Q components of this transmitter leakage signal Vl, i.e. Vli and Vlq respectively, are separately suppressed in the I and Q signal paths to result in a suppressed transmitter leakage signal having a magnitude at most substantially equal to the maximum receiver input level, which is acceptable and does not degrade the performance noticeably.

The phase shift of the transmitter leakage signal Vl occurring in the duplex filter DF will in practise not vary over 360°. This means, that not all four output signals CPI/CPQ of the deadzone control means 5 and 6 at their respective positive and negative I and Q output terminals 5+, 5− and 6+, 6− will vary in magnitude. Dependent from the I/Q phase quadrant(s), the vector representing the transmitter leakage signal Vl occurring at the receiver input never enters, one or two of the operational transconductor amplifiers 7', 7", 8' and 8" can be omitted. For example, if vector Vl only varies over a phase angle within the first I/Q phase quadrant (the projections of Vl on the I and Q axis being positive), than only transconductor amplifiers 7' and 8' are needed and the operational transconductor amplifiers 7" and 8" can be dispensed with. This simplifies the implementation of the corrective signal means. In general, the phase shift of the duplex filter DF can be measured once and dependent on this phase shift one or more of the transconductor amplifiers 7', 7", 8' and 8" can be omitted.

FIG. 6 shows a vector diagram illustrating the reduction of transmitter leakage in a communication device according to the invention when using a non-ideal quadrature phasesplitter 10. Despite of the non-orthogonal I/Q phase splitting, the corrective signal means according to the invention remain to be effective, reducing the I and Q components of the transmitter leakage signal Vl an acceptable magnitude.

The invention claimed is:

1. A communication device comprising:
   a transmitter,
   a receiver,
      the transmitter and receiver being coupled to an antenna respectively via a transmitter output and a receiver input, and
   a signal corrector that is configured to reduce a transmitter leakage signal at the receiver input,
   characterized in that
   the signal corrector comprises
      a transmitter leakage signal amplifier that is configured to selectively amplify the transmitter leakage signal, wherein
         a transmitter signal reference input of the amplifier is coupled to the transmitter output,
         a transmitter leakage signal input of the amplifier is coupled to the receiver input, and
         a transmitter leakage signal output of the amplifier is coupled to the transmitter leakage signal input to provide a negative feedback of the transmitter leakage signal occurring at the receiver input,
   characterized in that
   the transmitter leakage signal amplifier comprises:
      a phase splitter,
      a first demodulator and a second demodulator,
      a first low pass filter and a second low pass filter
      a first modulator and a second modulator, and
      a phase inverter,
   wherein:
      an input of the phase splitter is coupled to the transmitter output,
      the phase splitter is configured to supply respectively in-phase and quadrature phase components of the transmitter output to reference signal inputs of the first and second demodulators, as well as to carrier signal inputs of the first and second modulators,
      the first and second demodulators include:
         transmitter leakage signal inputs in common with the transmitter leakage signal input of the signal corrector, and
         outputs coupled respectively through the first and second low pass filters to modulating signal inputs of the first and second modulators,
      an output of each of the first and second modulators is coupled in common to the receiver input and the transmitter leakage signal inputs of the first and second demodulators to form a feedback path to the receiver input, and
      the phase inverter is included in the feedback path to provide the negative feedback of the transmitter leakage signal occurring at the receiver input.

2. The communication device according to claim 1, characterized in that
   the first and second modulators each comprise
      at least one transconductance amplifier, having an output that is coupled in common to the receiver input and the transmitter leakage signal inputs of the first and second demodulators.

3. The communication device according to claim 2, characterized in that
   the transmitter leakage signal amplifier provides a nonlinear amplification of the transmitter leakage signal, based on an amplitude of the transmitter leakage signal.

4. The communication device according to claim 3, further including
   an attenuator coupled between the antenna and the transmitter signal reference input of the signal corrector.

5. The communication device according to claim 3, further including
   a duplex filter having first and second stages,
      the transmitter output being coupled through the first stage to the antenna,
      the antenna being coupled through the second stage to the receiver input and to the transmitter signal reference input of the signal corrector.

6. The communication device according to claim 5, further including
   an attenuator coupled between the antenna and the transmitter signal reference input of the signal corrector.

7. The communication device according to claim 3, further including
   a dead zone controller coupled between the first and second low pass filters and the first and second modulators that is configured to:
      suppress amplitude variations of the respective output signals of the first and second lowpass filters within a range between predetermined first and second threshold levels, and
      amplify the amplitude variations beyond said range.

8. The communication device according to claim 7, wherein the range is based on a maximum receiver input voltage.

9. The communication device according to claim 7, further including
a duplex filter having first and second stages,
the transmitter output being coupled through the first stage to the antenna,
the antenna being coupled through the second stage to the receiver input and to the transmitter signal reference input of the signal corrector.

10. The communication device according to claim 9, further including
an attenuator coupled between the antenna and the transmitter signal reference input of the signal corrector.

11. The communication device according to claim 10, characterized in that
the dead zone controller comprises
a splitter that is configured to split in-phase and quadrature phase components of the transmitter signal reference input into positive and negative in-phase and positive and negative quadrature phase components, the amplitude varying components thereof being supplied to control inputs of variable transconductor amplifiers included in the first and second modulators, and
the outputs of the first and second modulators are coupled through phase inverting means to the transmitter leakage output of the signal corrector.

12. The communication device according to claim 10, characterized in that:
the dead zone controller comprises
first and second in-phase signal splitters and
first and second quadrature phase signal splitters that are configured to split in-phase and quadrature phase components of the transmitter signal reference input into positive and negative in-phase and positive and negative quadrature phase components,
the positive, respectively negative, components are supplied to control inputs of first variable transconductor amplifiers of the first and second modulators, respectively through first and second phase inverters to second variable transconductor amplifiers of the first and second modulators, and
outputs of the first variable transconductor amplifiers and outputs of the second variable transconductor amplifiers are coupled through third and fourth phase inverters to the transmitter leakage output of the signal corrector.

13. The communication device according to claim 9, characterized in that
the dead zone controller comprises
a splitter that is configured to split in-phase and quadrature phase components of the transmitter signal reference input into positive and negative in-phase and positive and negative quadrature phase components, the amplitude varying components thereof being supplied to control inputs of variable transconductor amplifiers included in the first and second modulators, and
the outputs of the first and second modulators are coupled through phase inverting means to the transmitter leakage output of the signal corrector.

14. The communication device according to claim 9, characterized in that:
the dead zone controller comprises
first and second in-phase signal splitters and
first and second quadrature phase signal splitters that are configured to split in-phase and quadrature phase components of the transmitter signal reference input into positive and negative in-phase and positive and negative quadrature phase components,
the positive, respectively negative, components are supplied to control inputs of first variable transconductor amplifiers of the first and second modulators, respectively through first and second phase inverters to second variable transconductor amplifiers of the first and second modulators, and
outputs of the first variable transconductor amplifiers and outputs of the second variable transconductor amplifiers are coupled through third and fourth phase inverters to the transmitter leakage output of the signal corrector.

15. The communication device according to claim 7, further including
an attenuator coupled between the antenna and the transmitter signal reference input of the signal corrector.

16. The communication device according to claim 15, characterized in that
the dead zone controller comprises
a splitter that is configured to split in-phase and quadrature phase components of the transmitter signal reference input into positive and negative in-phase and positive and negative quadrature phase components, the amplitude varying components thereof being supplied to control inputs of variable transconductor amplifiers included in the first and second modulators, and
the outputs of the first and second modulators are coupled through phase inverting means to the transmitter leakage output of the signal corrector.

17. The communication device according to claim 15, characterized in that:
the dead zone controller comprises
first and second in-phase signal splitters and
first and second quadrature phase signal splitters that are configured to split in-phase and quadrature phase components of the transmitter signal reference input into positive and negative in-phase and positive and negative quadrature phase components,
the positive, respectively negative, components are supplied to control inputs of first variable transconductor amplifiers of the first and second modulators, respectively through first and second phase inverters to second variable transconductor amplifiers of the first and second modulators, and
outputs of the first variable transconductor amplifiers and outputs of the second variable transconductor amplifiers are coupled through third and fourth phase inverters to the transmitter leakage output of the signal corrector.

18. The communication device according to claim 7, further including
an attenuator coupled between the antenna and the transmitter signal reference input of the signal corrector.

19. The communication device according to claim 2, further including
a duplex filter having first and second stages,
the transmitter output being coupled through the first stage to the antenna,
the antenna being coupled through the second stage to the receiver input and to the transmitter signal reference input of the signal corrector.

20. The communication device according to claim 19, further including
an attenuator coupled between the antenna and the transmitter signal reference input of the signal corrector.

21. The communication device according to claim 2, further including an attenuator coupled between the antenna and the transmitter signal reference input of the signal corrector.

22. The communication device according to claim 1, characterized in that
the transmitter leakage signal amplifier provides a non-linear amplification of the transmitter leakage signal, based on an amplitude of the transmitter leakage signal.

23. The communication device according to claim 22, further including
a dead zone controller coupled between the first and second low pass filters and the first and second modulators that is configured to:
suppress amplitude variations of the respective output signals of the first and second lowpass filters within a range between predetermined first and second threshold levels, and
amplify the amplitude variations beyond said range.

24. The communication device according to claim 23, wherein the range is based on a maximum receiver input voltage.

25. The communication device according to claim 24, further including
a duplex filter having first and second stages,
the transmitter output being coupled through the first stage to the antenna,
the antenna being coupled through the second stage to the receiver input and to the transmitter signal reference input of the signal corrector.

26. The communication device according to claim 25, further including
an attenuator coupled between the antenna and the transmitter signal reference input of the signal corrector.

27. The communication device according to claim 25, characterized in that
the dead zone controller comprises
a splitter that is configured to split in-phase and quadrature phase components of the transmitter signal reference input into positive and negative in-phase and positive and negative quadrature phase components, the amplitude varying components thereof being supplied to control inputs of variable transconductor amplifiers included in the first and second modulators, and
the outputs of the first and second modulators are coupled through phase inverting means to the transmitter leakage output of the signal corrector.

28. The communication device according to claim 25, characterized in that:
the dead zone controller comprises
first and second in-phase signal splitters and
first and second quadrature phase signal splitters that are configured to split in-phase and quadrature phase components of the transmitter signal reference input into positive and negative in-phase and positive and negative quadrature phase components,
the positive, respectively negative, components are supplied to control inputs of first variable transconductor amplifiers of the first and second modulators, respectively through first and second phase inverters to second variable transconductor amplifiers of the first and second modulators, and
outputs of the first variable transconductor amplifiers and outputs of the second variable transconductor amplifiers are coupled through third and fourth phase inverters to the transmitter leakage output of the signal corrector.

29. The communication device according to claim 23, further including
an attenuator coupled between the antenna and the transmitter signal reference input of the signal corrector.

30. The communication device according to claim 29, characterized in that:
the dead zone controller comprises
first and second in-phase signal splitters and
first and second quadrature phase signal splitters that are configured to split in-phase and quadrature phase components of the transmitter signal reference input into positive and negative in-phase and positive and negative quadrature phase components,
the positive, respectively negative, components are supplied to control inputs of first variable transconductor amplifiers of the first and second modulators, respectively through first and second phase inverters to second variable transconductor amplifiers of the first and second modulators, and
outputs of the first variable transconductor amplifiers and outputs of the second variable transconductor amplifiers are coupled through third and fourth phase inverters to the transmitter leakage output of the signal corrector.

31. The communication device according to claim 29, characterized in that
the dead zone controller comprises
a splitter that is configured to split in-phase and quadrature phase components of the transmitter signal reference input into positive and negative in-phase and positive and negative quadrature phase components, the amplitude varying components thereof being supplied to control inputs of variable transconductor amplifiers included in the first and second modulators, and
the outputs of the first and second modulators are coupled through phase inverting means to the transmitter leakage output of the signal corrector.

32. The communication device according to claim 22, wherein
the transmitter leakage signal amplifier is configured to:
suppress amplitude variations of the transmitter leakage signal within a range between predetermined first and second threshold levels, and
amplify the amplitude variations beyond said range.

33. The communication device according to claim 32, further including
a duplex filter having first and second stages,
the transmitter output being coupled through the first stage to the antenna,
the antenna being coupled through the second stage to the receiver input and to the transmitter signal reference input of the signal corrector.

34. The communication device according to claim 32, further including
an attenuator coupled between the antenna and the transmitter signal reference input of the signal corrector.

35. The communication device according to claim 22, further including
a duplex filter having first and second stages,
the transmitter output being coupled through the first stage to the antenna,
the antenna being coupled through the second stage to the receiver input and to the transmitter signal reference input of the signal corrector.

36. The communication device according to claim 35, further including
an attenuator coupled between the antenna and the transmitter signal reference input of the signal corrector.

37. The communication device according to claim 1, further including
   a duplex filter having first and second stages,
      the transmitter output being coupled through the first stage to the antenna,
      the antenna being coupled through the second stage to the receiver input and to the transmitter signal reference input of the signal corrector.

38. The communication device according to claim 37, further including
   an attenuator coupled between the antenna and the transmitter signal reference input of the signal corrector.

39. The communication device according to claim 1, further including
   an attenuator coupled between the antenna and the transmitter signal reference input of the signal corrector.

40. The communication device according to claim 39, characterized in that
   the transmitter leakage signal amplifier provides a non-linear amplification of the transmitter leakage signal, based on an amplitude of the transmitter leakage signal.

* * * * *